United States Patent
Sharp et al.

(10) Patent No.: US 8,966,556 B2
(45) Date of Patent: Feb. 24, 2015

(54) REAL-TIME MULTI-MEDIA STREAMING BANDWIDTH MANAGEMENT

(75) Inventors: Ronald L. Sharp, Clinton, NJ (US); Edward L. Sutter, Fanwood, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 522 days.

(21) Appl. No.: 12/399,561

(22) Filed: Mar. 6, 2009

(65) Prior Publication Data

US 2010/0229210 A1 Sep. 9, 2010

(51) Int. Cl.
  *H04N 7/173* (2011.01)
  *H04L 29/08* (2006.01)
  *H04L 12/801* (2013.01)
  *H04L 29/06* (2006.01)

(52) U.S. Cl.
  CPC .............. *H04L 67/306* (2013.01); *H04L 47/10* (2013.01); *H04L 65/602* (2013.01); *H04L 65/80* (2013.01); *H04L 69/24* (2013.01)
  USPC .............................................. 725/95; 725/109

(58) Field of Classification Search
  None
  See application file for complete search history.

(56) References Cited

U.S. PATENT DOCUMENTS

| | | | |
|---|---|---|---|
| 6,345,279 B1 | 2/2002 | Li et al. | |
| 6,981,045 B1 * | 12/2005 | Brooks | 709/226 |
| 2003/0095210 A1 * | 5/2003 | Huntley | 348/705 |
| 2006/0200518 A1 * | 9/2006 | Sinclair et al. | 709/204 |
| 2007/0024706 A1 * | 2/2007 | Brannon et al. | 348/142 |
| 2008/0118227 A1 * | 5/2008 | Barton | 386/112 |

FOREIGN PATENT DOCUMENTS

| | | |
|---|---|---|
| EP | 1 463 332 A1 | 9/2004 |
| JP | 2005-101980 A | 4/2005 |

OTHER PUBLICATIONS

International Search Report and Written mailed May 4, 2010 in PCT/US2010/025713, Alcatel-Lucent USA Inc., Applicant, 12 pages.
Nov. 13, 2012 Office Action in JP 2011-553000, Alcatel-Lucent, Applicant, 4 pages.

* cited by examiner

*Primary Examiner* — Cai Chen
(74) *Attorney, Agent, or Firm* — Wall & Tong, LLP (57) ABSTRACT

A multi-media method, system and apparatus are provided to optimize a network bandwidth and enhanced video experience. Each of a plurality of environmental views are encoded and the encoded multi-media streams are subsequently transcoded in accordance with respective encoding characteristics. The resulting video streams are then provided to a user for selecting preferred views. The user's multi-media preferential attributes are determined from the viewer's feedback. In response to the viewers' feedback, a video manager communicates to the cameras/encoders encoding characteristics and to the transcoders transcoding characteristics associated with corresponding encoded multi-media streams. A transport processor encodes for transport each of a plurality of the transcoded video streams and communicate towards viewers the transcoded video streams.

26 Claims, 9 Drawing Sheets

REAL-TIME MULTI-MEDIA STREAMING BANDWIDTH MANAGEMENT

FIELD OF THE INVENTION

This invention relates to real-time multi-media streaming and more particularly to real time video streaming of multiple cameras over a network.

BACKGROUND

The availability of low cost, high resolution video cameras facilitates their proliferation in various applications and environments. At typical resolution, frame rate and color depth, the bandwidth required to stream the resulting video imaging can be very high, even with advanced compression techniques. This in turn results in significant challenges for IP-based networks to provide some type of quality of service (QoS) guarantee for different types of traffic. The prior art addresses the bandwidth constraint issue by manually limiting the resolution and/or frame rate of the camera views. This approach does reduce bandwidth, but at the cost of picture quality.

BRIEF SUMMARY OF THE INVENTION

Various deficiencies of the prior art are addressed by the real-time multi-media streaming method and system. Specifically, the method comprises the steps of: transcoding each of a plurality of multi-media streams in accordance with respective encoding characteristics to provide a transcoded multimedia stream; forwarding each transcoded multimedia stream towards a plurality of viewers; and adapting, in response to preference-indicative feedback from one or more users, the encoding characteristics associated with at least one transcoded multimedia stream to reduce thereby a bandwidth requirement associated with the at least one transcoded multimedia stream.

Another embodiment provides a system having a video manager, communicatively coupled to one or more cameras/encoders, one or more transcoders and one or more transport processors, the video manager receives indicia of viewers' video preferences and responsively adapts encoding characteristics of said cameras/encoders and transcoders to provide thereby transcoded video streams according to said viewer video preferences. The system further comprises a plurality of transcoders, each of the transcoders operable to transcode a respective video stream having initial characteristics into a subsequent video stream having subsequent video characteristics. As part of the system, a transport processor is adapted to encode for transport each of a plurality of transcoded video streams; additionally, the transport processor communicates towards viewers one or more of the transcoded video streams.

BRIEF DESCRIPTION OF THE DRAWINGS

The teachings of the present embodiments can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The various deficiencies of the prior art are addressed, for example, by removing one or more of any views far away from a speaker at a meeting, providing lesser quality to the side views, focusing and providing maximum quality to the focus of interest. The notion of user-based bandwidth management in which bandwidth policies are based on a user as well as application is achieved by incorporating a viewer's preference into the encoding process and allocating bandwidth accordingly.

In general, a remote meeting viewer (attendee) looks at only a small portion (i.e. scene) of the overall video at any one time; additionally, most viewers are likely to be continually looking at the same scene. For example, the majority of a meeting's attendees focus on the current speaker. The viewer is unable to look behind him/her. Furthermore, the scene within the peripheral view is important but the eye typically does not provide the same resolution and quality as the center view.

The aforementioned embodiments will be primarily described within the context of a real-time video streaming; however, those skilled in the art and informed by the teachings herein will realize that the invention is also applicable to multi-media systems in which bandwidth management is desired.

Figure 1:
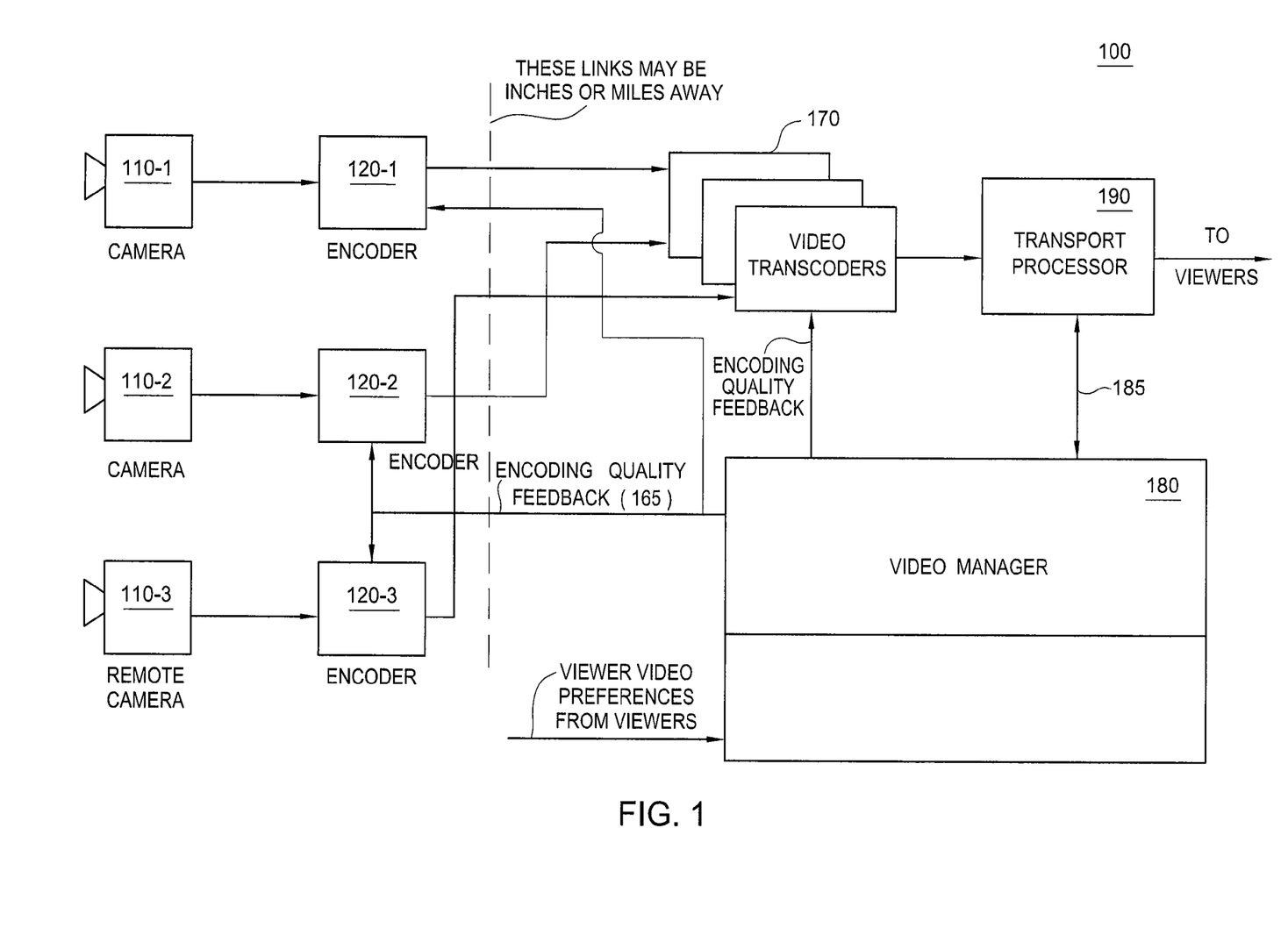
FIG. 1 depicts a block diagram of a real-time video streaming system according to one embodiment.

FIG. 1 depicts a block diagram of a real-time video streaming system according to one embodiment. The system 100 of FIG. 1 comprises a plurality of cameras 110-1 through 110-3 providing image signals to respective encoders 120-1 through 120-3. The cameras 110 may comprise local or remote cameras. The encoded output from each encoder 120 is fed to a respective video transcoder 170. The link between the encoders and the transcoders may be inches or miles in length. Furthermore, the link may be a cable or fiber optic link, a microwave link, a telephone network link, a combination of such links, or any other suitable communications path.

The transcoded outputs are fed to a transport processor 190, which further encodes the streams for propagation towards the viewers. The transport processor allocates bandwidth consistent with the transcoded video streams characteristics. In other embodiments, side views are allocated bandwidth based on their relative importance and available network bandwidth.

The cameras and their respective encoders, one or more trancoders 170, and one or more transport processors 190, are communicatively coupled to a video manager 180, which also receives indicia of viewers' video preferences or quality feedback. Video manager 180 provides the one or more transport processors 190 with viewers' video preferences and controls 185. The video manager also provides viewer level quality selection 165 to appropriate transcoders. The viewer level quality selection or feedback includes frame rate, resolution, color depth, coding algorithm and zoom. The video manager further provides the maximum required quality selection to each encoder 120. These quality selections include, illustratively, frame rate, resolution, color depth and coding algorithm. In one embodiment, there is only one camera, one encoder and one transcoder.

Figure 2:
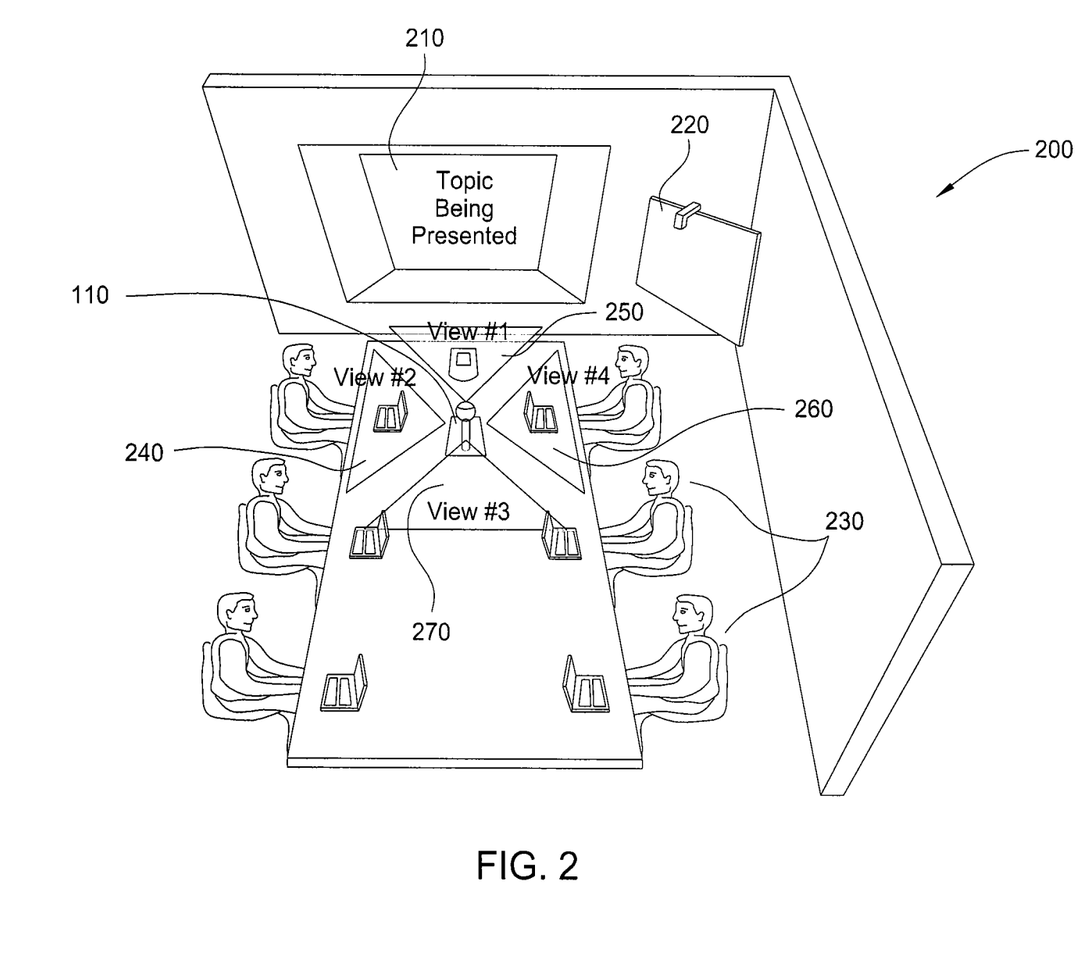
FIG. 2 graphically illustrates environmental views of a video conference according to one embodiment.

FIG. 2 graphically illustrates environmental views of a video conference according to one embodiment. Referring to FIG. 2, a meeting room 200 is shown equipped with multi-camera device 110, a projection screen 210, a white board 220, local attendees 230 and a number of remote attendees (not shown) communicatively coupled to the multi-camera device. Each camera in the multi-camera device provides a subset of the total view provided by the set of cameras and each remote viewer (attendee) is able to select which view 240-270 to receive.

Figure 3:
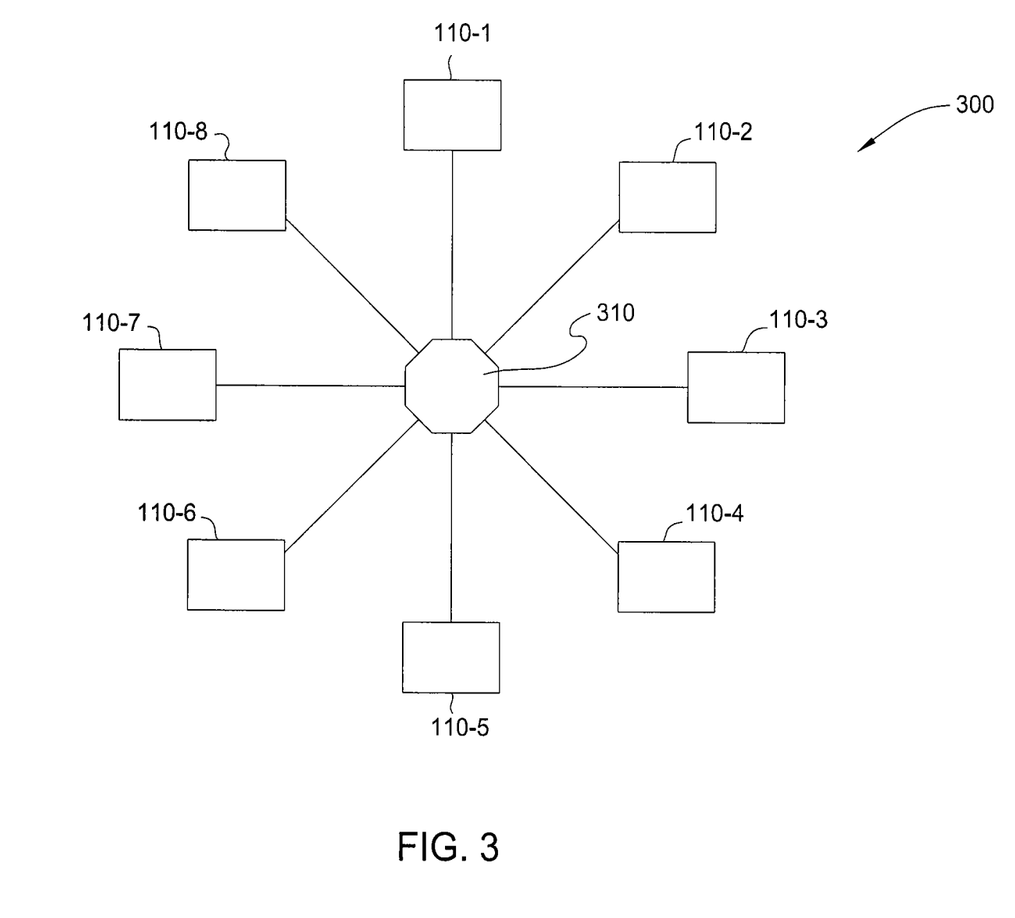
FIG. 3 graphically depicts a preferred arrangement of each camera in a device according to one embodiment.

FIG. 3 graphically depicts a preferred arrangement of each camera in a device according to one embodiment. The camera arrangement as shown in FIG. 3 aggregates in a star-configuration 310. The camera arrangement allows for a circumferential view of the meeting environment. In other embodiments, additional views of a different meeting room are provided by a remote camera and its respective encoder.

As discussed above with respect to FIG. 1, each remote user has the ability to communicate with the video manager to select the preferred view and adjust size and other attributes of that particular view. With this information, the video manager responsively optimizes the viewer's experience by, illustratively, removing views far away from the speaker, providing lesser quality to the side views, focusing and providing maximum quality to the central focus and the like. The objective is to provide viewer and network information to the video packet source in order to reduce bandwidth and enhance the overall video experience. The video manager adjusts the quality of the streams to balance the bandwidth available within the network using some or all of the following information: (1) knowledge of which video streams are actually being viewed by the remote users—this allows the system to drop transmission of scenes not being requested or to increase video quality to favored streams; and (2) the importance of each stream to a user as indicated by several factors including amount of screen real estate devoted to viewing a stream.

In one embodiment, the viewer does not have the flexibility to select preferred views; the views provided are fixed. In other embodiments, the viewer can select preferred views.

The manner for a viewer to select a view or otherwise indicate a preference will now be discussed with reference to FIGS. 4-6. There are, illustratively, two major options available to a user to indicate preferences: in-frame expansion as depicted in FIG. 5 and frame selection shown in FIG. 6. It will be understood by an artisan of ordinary skill in the art that the invention is not limited to these two options, but that other variations are possible such as by selecting a number of views to indicate a first preference, a second preference, a third preference and so on.

Figure 4:
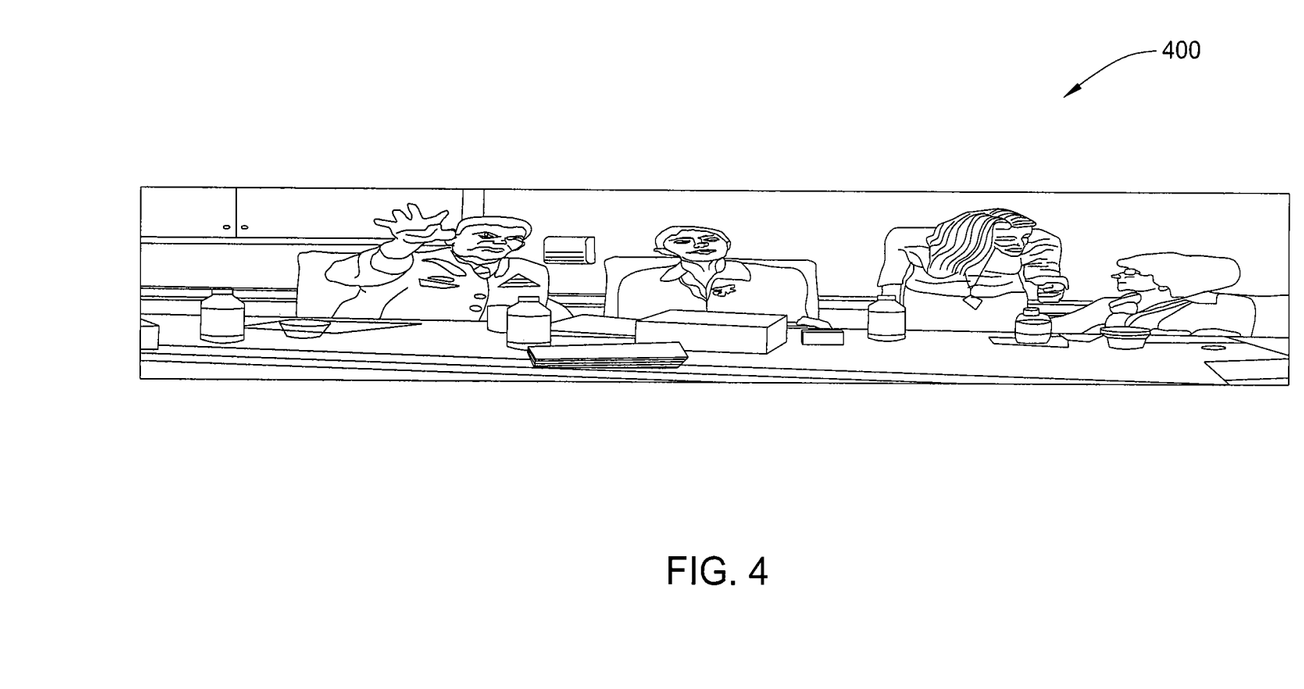
FIG. 4 graphically depicts a panoramic view of a video conference in a real-time video streaming system according to one embodiment.
Figure 5:
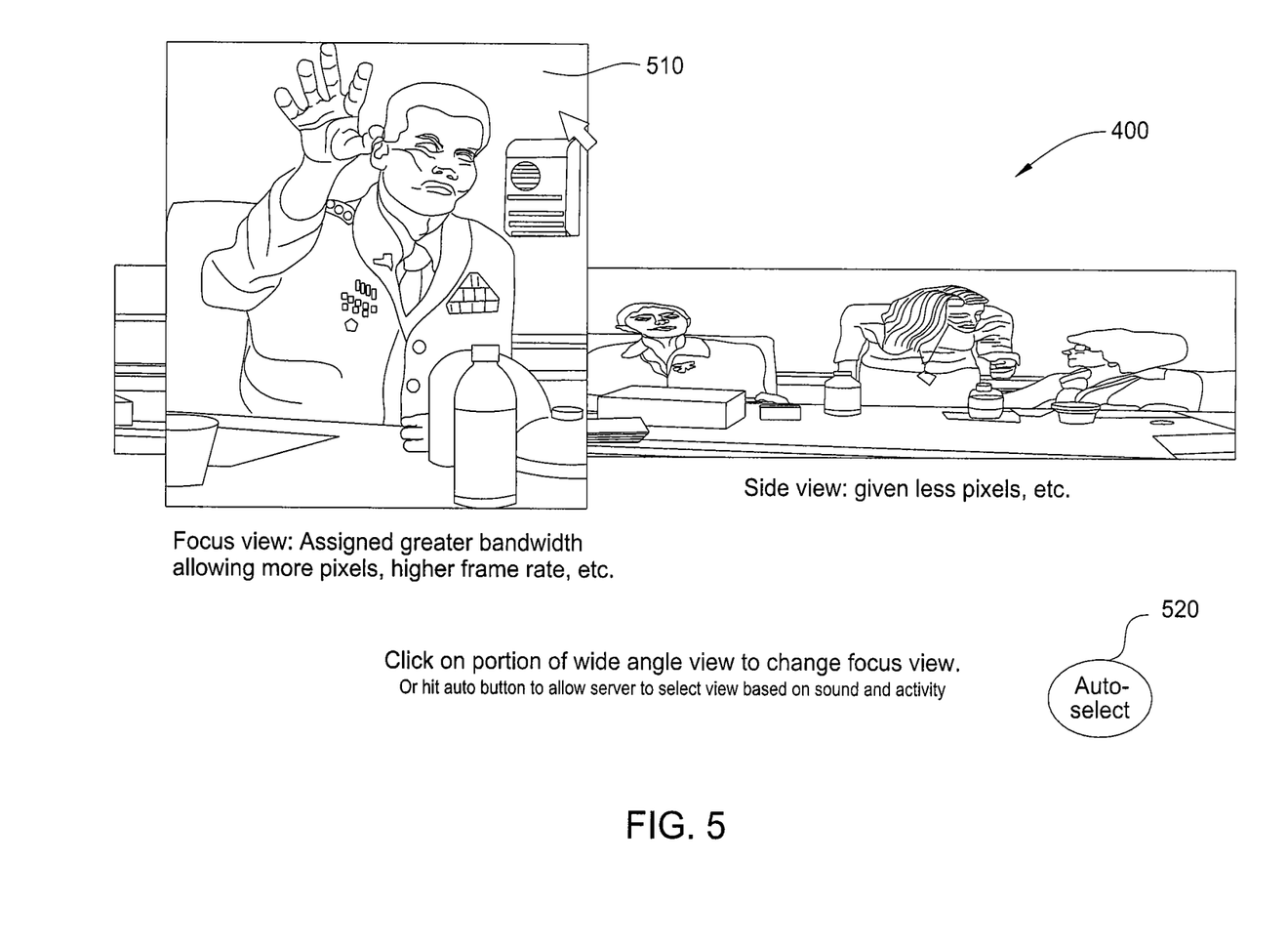
FIG. 5 depicts Viewer Selection by In-Frame Expansion in a real-time video streaming system according to one embodiment.

FIG. 4 graphically depicts a panoramic view of a video conference in a real-time video streaming system according to one embodiment. Specifically, the meeting environment of FIG. 4 shows four attendees including a speaker. The viewer has the ability to select or "click" on an area within the view to be emphasized. This method is referred to as in frame expansion.

FIG. 5 depicts Viewer Selection by In-Frame Expansion in a real-time video streaming system according to one embodiment. As shown in FIG. 5, the view selected by the viewer or the view of interest (focus) 510 is assigned greater bandwidth allowing for more pixels, higher frame rate and better resolution. As indicated above, the side view is de-emphasized, given less pixels and hence lesser quality. The viewer has the ability to click on portion of the wide angle view to change the view of interest. Alternatively, in another embodiment the viewer can hit auto button 520 to allow the video manager (server) to select a view based on sound and activity.

Figure 6:
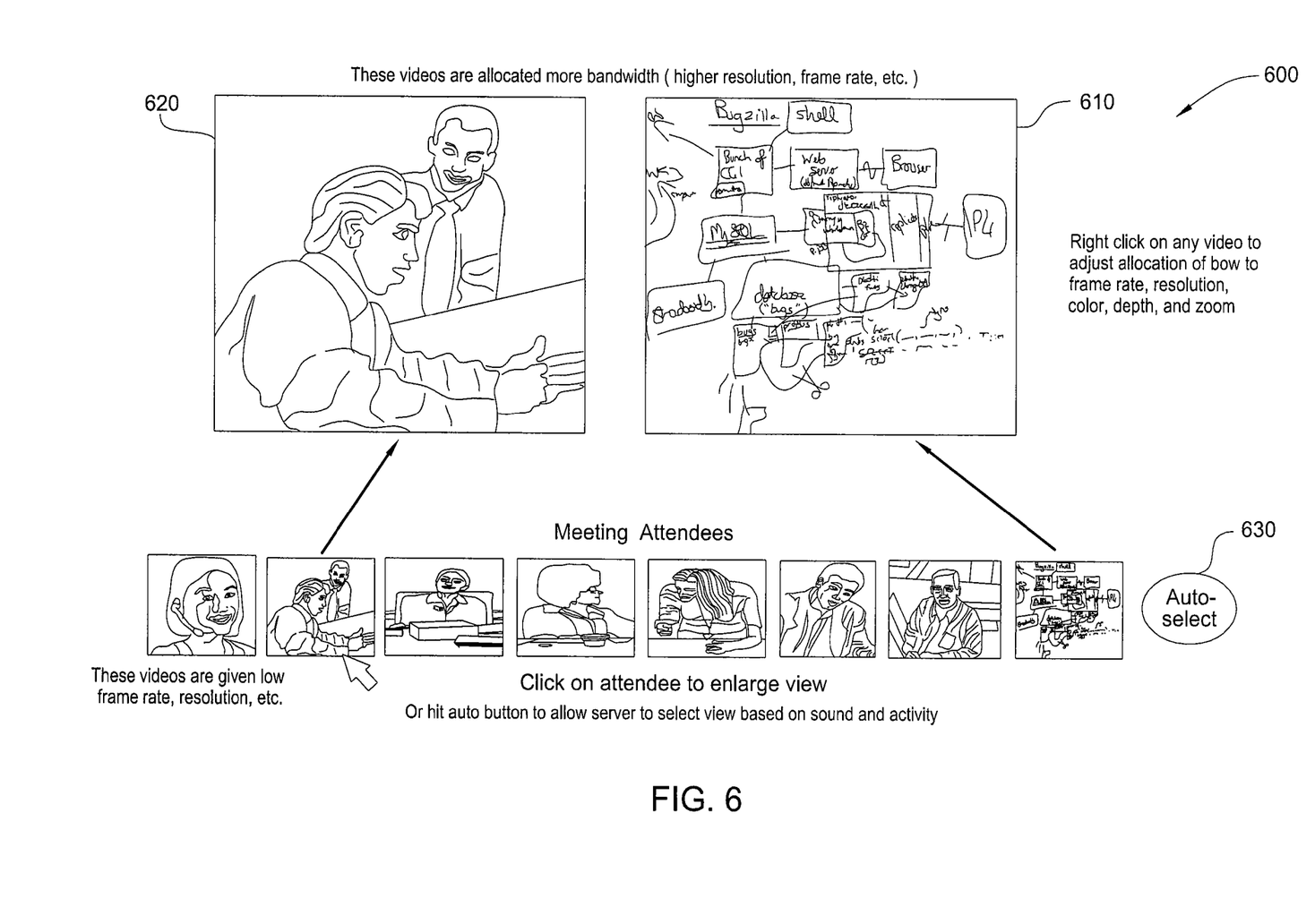
FIG. 6 depicts Viewer selection by Frame Selection in a real-time video streaming system according to one embodiment.

The other major option is frame selection depicted in FIG. 6. FIG. 6 depicts Viewer selection by Frame Selection in a real-time video streaming system according to one embodiment. Specifically, seven meeting attendees are shown separately with a white board displaying notes from the meeting. The viewer has the ability to click on any of the frames or videos to enlarge the view (610, 620). Once chosen, the viewer has the ability to 'right click' (i.e. depressing the right switch of the mouse) on any of the chosen video to adjust allocation of bandwidth to frame rate, resolution, color depth and zoom. In this case, two videos were chosen, the other videos (not chosen) are given low frame rate, resolution and other attributes. Alternatively, in another embodiment the viewer can hit auto button 630 to allow the video manager (server) to select a view based on sound and activity.

While the foregoing is directed to various embodiments of the present invention, other and further embodiments of the invention may be devised without departing from the basic scope thereof. As such, the appropriate scope of the invention is to be determined according to the claims, which follow.

Figure 7:
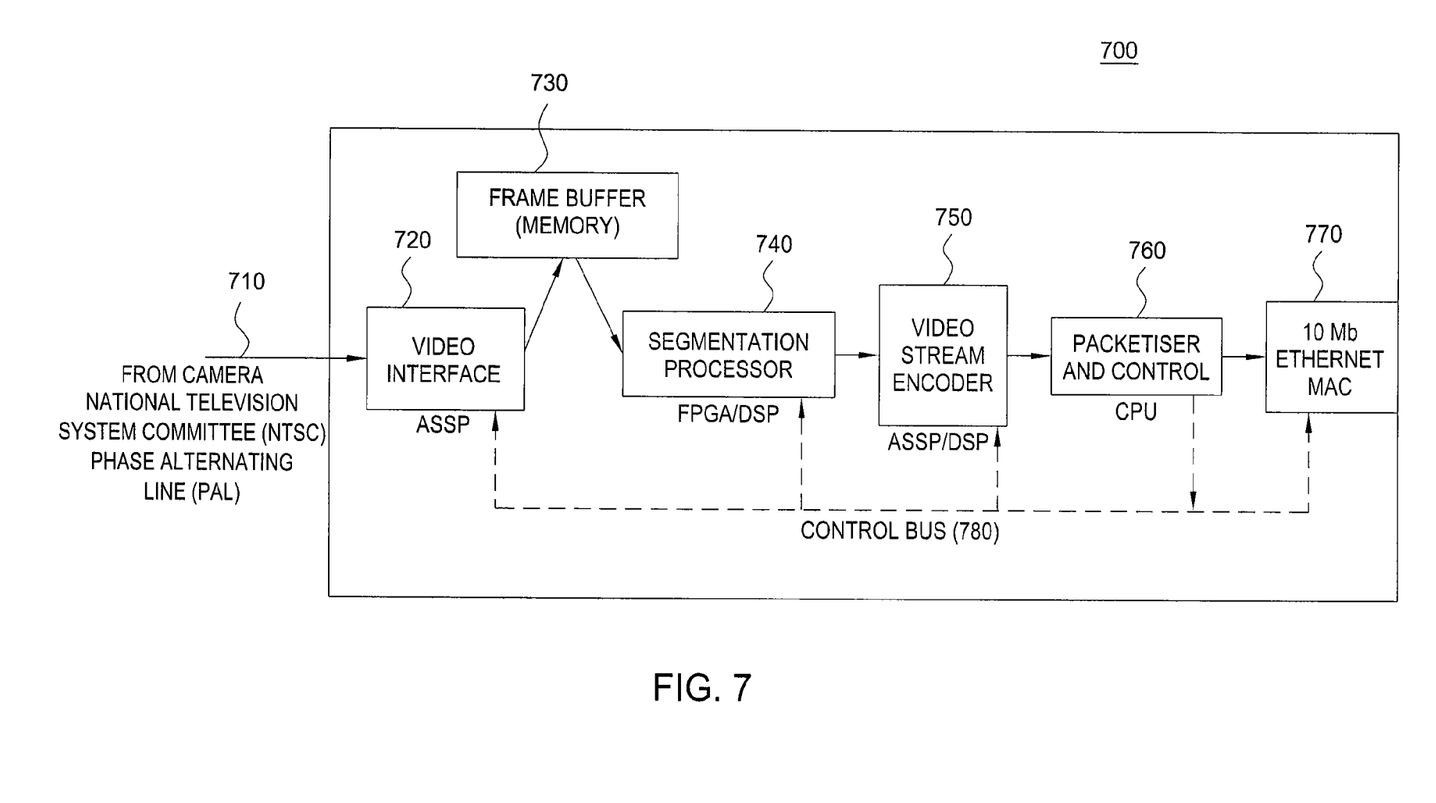
FIG. 7 depicts a block diagram of an Encoder Device in a real-time video streaming system according to one embodiment.

FIG. 7 depicts a block diagram of an Encoder Device in a real-time video streaming system according to one embodiment.

Figure 8:
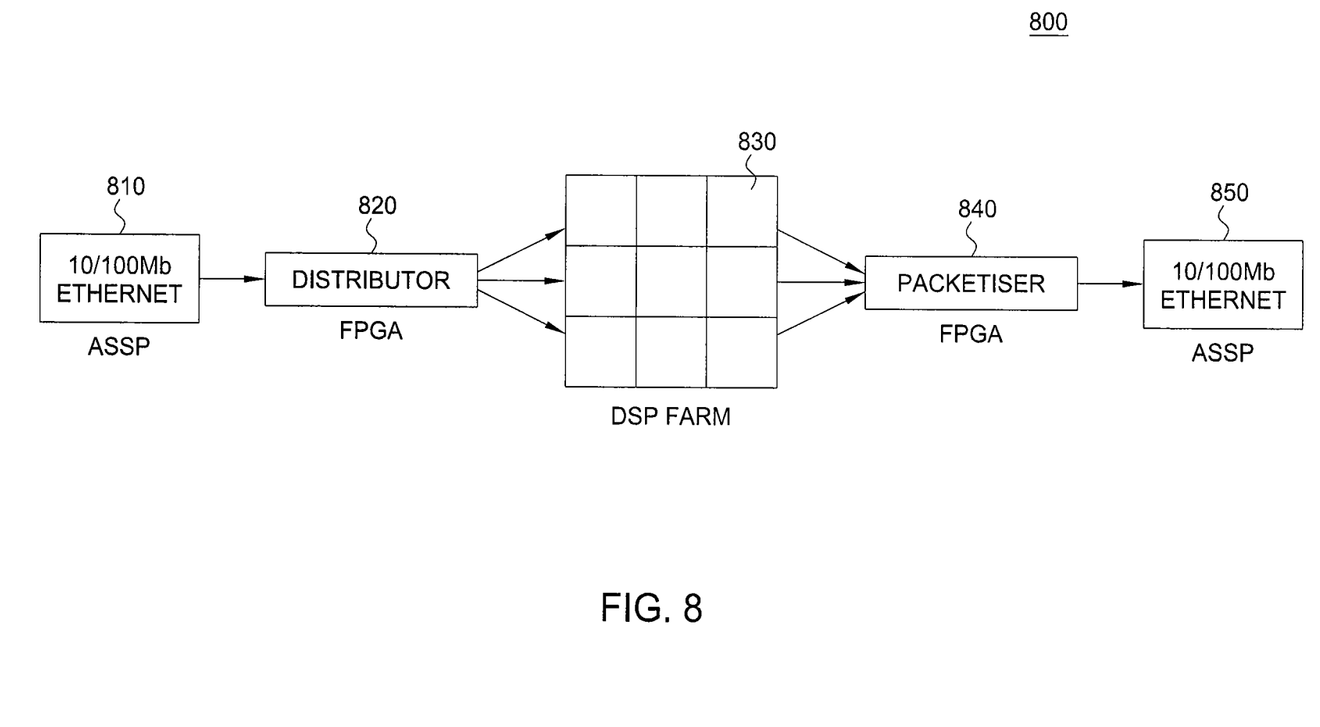
FIG. 8 depicts a block diagram of a Video Transcoder Device in a real-time video streaming system according to one embodiment.

Encoder Device 700 includes at least a Video Interface 720 for converting the incoming video signal 710 to a memory-based Frame Buffer 730, a Segmentation Processor 740 for segmenting, "cropping" or optimizing a picture because the field of view may be wider; a Video Stream Encoder 750 for compressing and formatting the stream for network transfer; a Packetiser and Control Central Processing Unit (CPU) 760 for packetizing the video frames and an Ethernet Medium Access Control 770 for transmitting the packetized video stream to Video Transcoder Device 800 depicted in FIG. 8 below. A Control Bus 780 under the control of the CPU provides commands and controls to each of the different modules, wherein the modules are communicatively coupled to the CPU in stages. Each stage performs a specific function. A stage and/or function may be combined or expanded to meet bandwidth requirements and/or optimize certain characteristics, e.g., latency, response times, etc.

Video Interface 720 comprises in one embodiment an Application Specific Standard Product (ASSP) or off-the-shelf Application Specific IC (ASIC) (used interchangeably throughout). In other embodiment, Video Interface Encoder 720 comprises a Digital Signal Processor (DSP). Video Interface Encoder 720 accepts video inputs conforming to various standards such as National Television System Committee (NTSC) standard, Phase Alternating Line (PAL) standard or any digital video signal and adapts the video signal to a format suitable for processing.

Segmentation Processor 740 combines in one embodiment a Field Programmable Gate Array (FPGA) and a DSP to process the video frames. In another embodiment, Segmentation Processor 740 comprises an FPGA or a plurality of FPGAs. In other embodiment, Segmentation Processor 740 comprises a DSP.

Frame Buffer 730 is memory. Just like the other components, the memory is not limited to any currently existing computing product, and may be adapted to take advantage of new devices as they become available.

Video Stream Encoder 750 is designed in one embodiment using the combination of an ASSP and a DSP. In another embodiment, the functions of Video Stream Encoder 750 are performed by a DSP or equivalent. In other embodiments, Video Stream Encoder 750 is designed using components, which comprise an ASSP.

CPU 760 and Ethernet MAC 770 are implemented in various embodiments using off-the-self standard equipment. However, just like the other components, CPU 760 and Ethernet MAC 770 are not limited to any currently existing computing product, and may be adapted to take advantage of new devices as they become available. Specifically, Ethernet MAC 770 transmits the video stream to Video Transcoder Device 800.

FIG. 8 depicts a block diagram of a Video Transcoder Device in a real-time video streaming system according to one embodiment.

Figure 9:
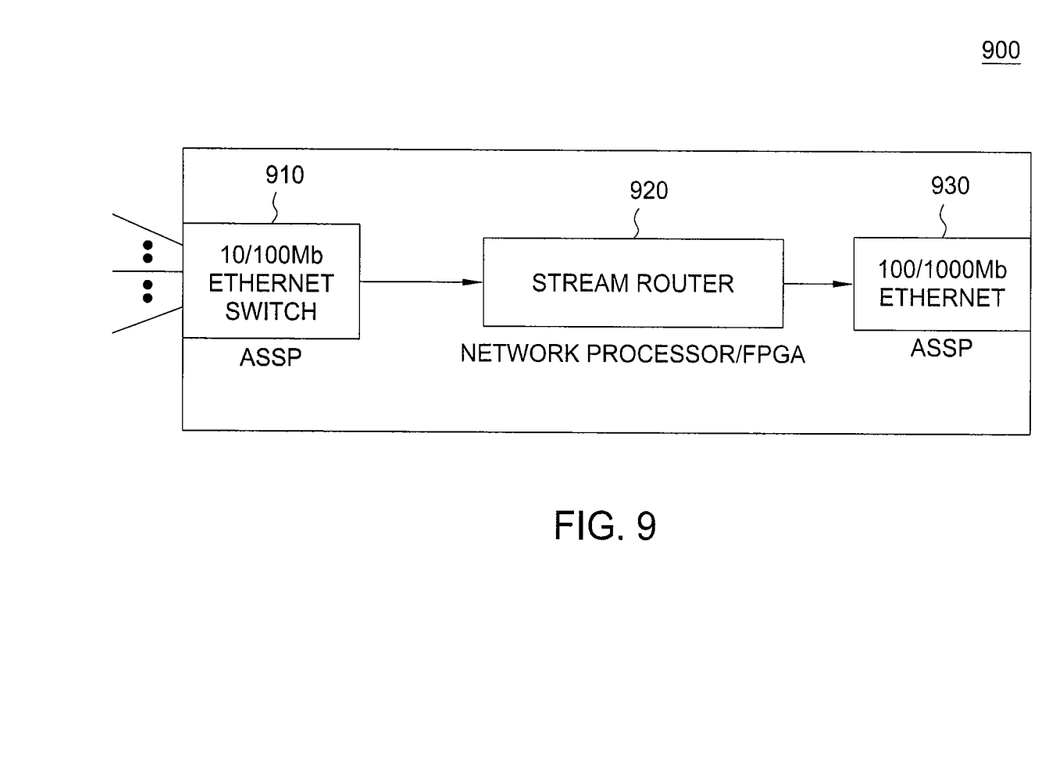
FIG. 9 depicts a block diagram of a Transport Processor Device in a real-time video streaming system according to one embodiment.

Video Transcoder Device 800 includes at least a High Speed Ethernet Interface module 810, for interfacing the plurality of encoders to the Video Transcoder Device; a Distributor 820 for distributing the input video based on the stream's characteristic; a DSP Farm 830 (or Multicore DSP) for parallel processing the multiple streams directed to a specific DSP by Distributor 820; a Packetiser 840 for framing the packets into Internet protocol (IP) data units; a High Speed Ethernet Interface 850 for transmitting the packetized video stream to Transport Processor Device 900 depicted in FIG. 9 below.

High Speed Ethernet Interface module 810 comprises in one embodiment an Application Specific Standard Product (ASSP) or off-the-shelf Application Specific IC (ASIC).

Distributor 820 is constructed in one embodiment from a Field Programmable Gate Array (FPGA). In other embodiment, Distributor module 820 comprises an off-the-shelf Application Specific IC (ASIC) or ASSP. In another embodiment, Distributor module 820 comprises a Digital Signal Processor (DSP). Distributor 820 determines, based on the stream, which DSP to direct the stream to. Just like the other components, both High Speed Ethernet Interface 850 and Distributor module 820 are not limited to any currently existing computing product, and may be adapted to take advantage of new devices as they become available.

DSP Farm (or Multicore DSP) 830 comprises a plurality of DSPs operating within a parallel architecture adapted for flexibility, redundancy and throughput among other characteristics. DSP Farm 830 transcodes each of the plurality of video streams using appropriate frame shaping technique resulting in video streams, which conform to users' preferences. In one embodiment, DSP Farm 830 includes FPGAs. In other embodiment, DSP Farm 830 includes ASSP or a combination of ASSP and FPGAs.

Packetiser 840 is constructed in one embodiment from a Field Programmable Gate Array (FPGA). In another embodiment, Packetizer module 840 comprises an off-the-shelf Application Specific IC (ASIC) or ASSP. In other embodiment, Packetizer module 840 comprises a Digital Signal Processor (DSP). Like its name implies, Packetiser 840 formats the plurality of transcoded streams into IP packets.

High Speed Ethernet Interface module 850 is constructed in one embodiment from an ASSP. In another embodiment, High Speed Ethernet Interface module 850 comprises a Field Programmable Gate Array (FPGA). In other embodiment, High Speed Ethernet Interface module 850 comprises a Digital Signal Processor (DSP). Just like the other components, High Speed Ethernet Interface module 850 is not limited to any currently existing computing product, and may be adapted to take advantage of new devices as they become available. High Speed Ethernet Interface 850 transmits the packetized video stream to Transport Processor Device 900 described below.

FIG. 9 depicts a block diagram of a Transport Processor Device in a real-time video streaming system according to one embodiment.

Transport Processor 900 includes at least an Ethernet Switch 910 for interfacing with the plurality of inputs stemming from the Video Transcoders and provides a suitable input to Stream Router 920, which performs the routing of the video stream and feeds the video stream to High Speed Ethernet 930 for transmission.

Ethernet Switch 910 is designed in one embodiment using an Application Specific Standard Product (ASSP) or ASIC. In other embodiment, Ethernet Switch 910 comprises a Digital Signal Processor (DSP).

Stream Router 920 is designed in one embodiment using a Network Processor in combination with an FPGA. In another embodiment, Stream Router 920 comprises a Network Processor. In other embodiment, the Stream Router comprises an FPGA. Just like the other components, the Stream Router is not limited to any currently existing computing product, and may be adapted to take advantage of new devices as they become available.

High Speed Ethernet 930 is designed in one embodiment using an Application Specific Standard Product (ASSP) or ASIC. In other embodiment, High Speed Ethernet 930 comprises a Digital Signal Processor (DSP).

What is claimed is:

1. A method for real-time multi-media streaming, comprising:
transcoding each of a plurality of multi-media streams in accordance with respective encoding characteristics to provide respective transcoded multi-media streams, wherein each multi-media stream comprises an encoded video of a respective subset view of a total view of at least one viewing environment with a plurality of cameras capturing corresponding subset views;
forwarding each transcoded multi-media stream towards a plurality of viewers;
receiving from at least one of the plurality of viewers an indication of a preferred subset view; and
adapting characteristics associated with at least one transcoded multi-media stream to improve viewer experience associated with the multi-media stream providing the preferred subset view, wherein optimization of the preferred subset view comprises providing lesser quality of non-preferred subset views.

2. The method of claim 1, wherein each of said plurality of viewers receives said adapted preferred subset view.

3. The method of claim 1, wherein multiple viewers receive said adapted preferred subset view.

4. The method of claim 1, wherein said characteristics comprise one or more of the following attributes: a frame rate, a resolution, a color depth, frequency components, a zoom, a coding algorithm, an available bandwidth and a range.

5. The method of claim 1, wherein each of said multi-media streams is provided by a respective camera/encoder configured to capture a respective subset view.

6. The method of claim 5, wherein said each camera/encoder is adapted to encode imagery according to provided encoding characteristics.

7. The method of claim 1, wherein each of a first portion of said plurality of multi-media streams is provided by a respective remote camera/encoder configured to capture a respective subset view.

8. A real-time multi-media streaming system, comprising:
a video manager, communicatively coupled to a plurality of transcoders configured to transcode respective multi-media streams in accordance with respective encoding characteristics, wherein each multi-media stream comprises an encoded video of a respective subset view of a total view of at least one viewing environment with a plurality of cameras capturing corresponding subset views;
a transport processor adapted to transport encode each transcoded multi-media stream for transport toward a plurality of viewers;
said video manager further configured to receive from at least one of the plurality of viewers an indication of a preferred subset view, and adapt characteristics associated with at least one transcoded multi-media stream to improve viewer experience associated with the multi-media stream providing the preferred subset view, wherein optimization of the preferred subset view comprises providing lesser quality of non-preferred subset views.

9. The system of claim 8, wherein said video manager is communicatively coupled to each of a plurality of cameras/encoders configured to capture respective subset views within said at least one viewing environment and provide corresponding multi-media streams to respective transcoders.

10. The system of claim 8, said video manager is communicatively coupled to each of a plurality of cameras/encoders configured to capture respective subset views within a different viewing environment and provide corresponding multi-media streams to respective transcoders.

11. The system of claim 8, wherein said encoding characteristics comprise one or more of the following attributes: a frame rate, a resolution, a color depth, frequency components, a zoom, a coding algorithm, an available bandwidth and a range.

12. The system of claim 8, wherein multiple viewers receive said adapted preferred subset view.

13. The system of claim 8, wherein each of said plurality of viewers receives said adapted preferred subset view.

14. The system of claim 8, wherein said transport processor allocates bandwidth according to said transcoded video streams characteristics.

15. A real-time multi-media streaming apparatus, comprising:
means for transcoding each of a plurality of multi-media streams in accordance with respective encoding characteristics to provide respective transcoded multi-media streams, wherein each multi-media stream comprises an encoded video of a respective subset view of a total view of at least one viewing environment with a plurality of cameras capturing corresponding subset views;
means for forwarding each transcoded multi-media stream towards a plurality of viewers;
means for receiving from at least one of the plurality of viewers an indication of a preferred subset view; and
means for adapting characteristics associated with at least one transcoded multi-media stream to improve viewer experience associated with the multi-media stream providing the preferred subset view, wherein optimization of the preferred subset view comprises providing lesser quality of non-preferred subset views.

16. A real-time multi-media transcoder apparatus, comprising:
a distributor for selecting one or more of a plurality of Digital Signal Processors (DSPs) to transcode respective multi-media streams in accordance with respective encoding characteristics to provide respective transcoded multi-media streams, wherein each multi-media stream comprises an encoded video of a respective subset view of a total view of at least one-viewing environment with a plurality of cameras capturing corresponding subset views;
wherein in response to forwarding each transcoded multi-media stream towards a plurality of viewers and to receiving from at least one of the plurality of viewers an indication of a preferred subset view, the distributor configured to perform said transcoding by
adapting characteristics associated with at least one transcoded multi-media stream to improve viewer experience associated with the multi-media stream providing the preferred subset view, wherein optimization of the preferred subset view comprises providing lesser quality of non-preferred subset views.

17. A real-time multi-media encoding apparatus, comprising:
a plurality of encoders, each of the encoders configured for processing a respective video signal for a corresponding multi-media stream, wherein each multi-media stream comprises an encoded video of a respective subset view of a total view of at least one viewing environment with a plurality of cameras capturing corresponding subset views;
wherein in response to forwarding each multi-media stream towards a plurality of viewers and to receiving from at least one of the plurality of viewers an indication of a preferred subset view, said encoders are configured to
adapt characteristics associated with at least one multi-media stream to improve viewer experience associated with the multi-media stream providing the preferred subset view, wherein optimization of the preferred subset view comprises providing lesser quality of non-preferred subset views.

18. The apparatus of claim 17, wherein said encoding parameters comprise one or more of the following: a frame rate, a resolution, a color depth, frequency components, a zoom, a coding algorithm, an available bandwidth and a range.

19. The apparatus of claim 17, further comprising:
at least one segmentation processor for reducing a frame size associated with a received video signal in response to said indication of the preferred subset view.

20. The apparatus of claim 15, further comprising:
a router for routing to users the adapted transcoded multi-media stream corresponding to the preferred subset view.

21. The method of claim 1, wherein said viewer experience is improved by removing subset views not proximate an audio source within the total view.

22. The method of claim 1, wherein said viewer experience is improved by transcoding at a reduced quality level of selected multi-media streams associated with subset views not proximate an audio source within the total view.

23. The method of claim 1, wherein said viewer experience is improved by transcoding at an enhanced quality level of selected multi-media streams associated with subset views proximate an audio source within the total view.

24. The method of claim 1, wherein said viewer experience is improved by transcoding at an enhanced quality level of portions within a multi-media stream of said multi-media streams spatially proximate an audio source within the total view.

25. The method of claim 1, wherein at least a portion of the total view is related to a meeting in a room and at least a portion of the subset views represent separate individual views of participants of the meeting taken by respective cameras.

26. The method of claim 1, wherein the total view is related to a meeting environment, and the subset views taken by respective cameras represent circumferential view of the meeting environment.

* * * * *